United States Patent [19]
Rao et al.

[11] Patent Number: 5,805,636
[45] Date of Patent: Sep. 8, 1998

[54] METHOD AND APPARATUS FOR SIMULTANEOUS VOICE, DATA, AND VIDEO COMMUNICATION IN A COMPUTER SYSTEM

[75] Inventors: Vijay Rao, Portland; Ramanan Ganesan, Hillsboro, both of Oreg.

[73] Assignee: Intel Corporation, Santa Clara, Calif.

[21] Appl. No.: 724,209

[22] Filed: Oct. 1, 1996

[51] Int. Cl.[6] ............................ G06F 13/00; H04M 11/06
[52] U.S. Cl. ...................... 375/222; 375/377; 379/93.09; 379/100.15; 379/100.16; 395/500; 395/884; 364/DIG. 1
[58] Field of Search ...................................... 375/219, 220, 375/222, 377; 364/DIG. 1, 241.9, DIG. 2; 379/93.05, 93.09, 100.15, 100.16; 395/500, 882, 884; 370/493–495

[56] References Cited

U.S. PATENT DOCUMENTS 5,524,047 6/1996 Brown et al. ......................... 379/93.11
5,628,030 5/1997 Tuckner ................................... 395/884
5,673,268 9/1997 Sharma et al. .......................... 370/522

*Primary Examiner*—Don N. Vo
*Assistant Examiner*—Amanda T. Le
*Attorney, Agent, or Firm*—Blakely, Sokoloff, Taylor & Zafman

[57] ABSTRACT

A memory is coupled to a processor in the computer system to implement a modem with simultaneous voice and data capabilities. The modem comprises a communication port to couple the computer system to a phone line, and software in the memory. The memory comprises a first software component which, when executed on the processor, provides a data input to the physical communication port, and a second software component which, when executed on the processor, provides a voice input to the physical communication port. The first and second software components cooperate to enable simultaneous voice and data communication through the physical communication port.

14 Claims, 3 Drawing Sheets

METHOD AND APPARATUS FOR SIMULTANEOUS VOICE, DATA, AND VIDEO COMMUNICATION IN A COMPUTER SYSTEM

BACKGROUND

1. Field of the Invention

The invention relates to the field of computer-based communications using a modem.

2. Art Background

Increasingly, users of personal computers find it desirable to use modems to simultaneously transmit different types of information, such as voice, video, and data. The term 'data' as used herein refers to digital information which is not voice or video information. For example, information from computer files or information generated from computer input devices such as keyboards and pointing devices is 'data'. Examples of applications which benefit from simultaneous voice, data, or video are on-line computer games, customer support, PC-based video conferencing, and PC-based video phones.

Currently, modems which can simultaneously transmit voice, video, and data are expensive because of the complicated functionality which must be built into these modems to handle the simultaneous transfer of voice, video, and data. Also, in many cases such modems do not work well with existing standard modem drivers, for the reasons set forth below.

Existing standard modem drivers, for example the Unimodem™ modem driver provided by the Microsoft™ Corporation, allow applications to place and control phone calls with a modem using a standard software interface. Modems typically connect to computers by way of a COM port, and the modem driver treats the COM port/modem combination as a single communication line. In other words, the driver does not allow more than one phone call to be active on a modem simultaneously. Thus, when a modem is being used to transmit voice information, the existing modem drivers will not allow a second connection to be established for transferring data using the same modem. Many simultaneous voice-data modems require such a second connection in order to enable simultaneous voice and data communication. Simultaneous video may require that a third connection be established using the same modem. The full simultaneous functionality of voice-data-video modems is thus defeated in many cases when existing standard modem drivers are used.

For example, consider a computer system running the Windows 95™ operating system with a International Telecommunications Union (ITU) V.70 DSVD (Digital Simultaneous Voice Data) modem installed. A software application for making voice calls uses the modem to establish a connection for communicating voice information. A second software application for making data calls then attempts to use the modem to establish a connection for communicating data information. The data connection fails because a voice connection is already in place using the modem, and the modem driver will not allow a second connection using the same modem. The modem driver recognizes the DSVD modem as a single logical modem and allows only one active connection on the modem at a time.

The modem driver allows multiple connections provided they are made on separate modems. It is therefore desirable to cause the modem driver to recognize the COM port/DSVD modem combination as multiple modems connected to multiple ports, each modem capable of establishing a connection for a particular type of information (voice, data, or video). In this manner, a voice connection can be made using a first logical modem and a data connection can be made using a second logical modem without causing the modem driver to report an error. Both connections are made using the same physical modem.

In a video conference, it is possible that in addition to voice and data, video information may also be exchanged. Some modems for video conferencing support simultaneous voice, data, and video on a single phone line. These modems may allow video conferences to be set up by establishing three connections—one for the voice information, one for the data information, and one for the video information. However, the same physical modem is used for all three connections. Video conferencing modems may also support DSVD modes of operation, since simultaneous voice and data can be accomplished without making a video connection.

It would be desirable to simplify the hardware requirements of simultaneous voice-data-video modems, so that they are less expensive to purchase and more accessible to the general public. At the same time, it would be desirable to enable applications that work with existing modem drivers to take advantage of the full simultaneous functionality of voice-data-video modems.

SUMMARY OF THE INVENTION

A memory is coupled to a processor in the computer system to implement a modem with simultaneous voice and data capabilities. The modem comprises a communication port to couple the computer system to a phone line, and software in the memory. The memory comprises a first software component which, when executed on the processor, provides a data input to the physical communication port, and a second software component which, when executed on the processor, provides a voice input to the physical communication port. The first and second software components cooperate to enable simultaneous voice and data communication through the physical communication port.

DETAILED DESCRIPTION

In the following description, numerous specific details are set forth such as block diagrams, flow diagrams, etc., in order to provide a thorough understanding of the present invention. In other instances, well- known structures and techniques have not been shown in detail because to do so may obscure the present invention. The specific arrangements and methods described herein are merely illustrative of the principles of the present invention. Numerous modifications in form and detail may be made by those of ordinary skill in the art without departing from the scope of the present invention. For example, although the port drivers and logical modems are shown as components of the communication manager, the port drivers and logical modems could also function as individual components which were not part of any larger component.

In one embodiment, the invention uses a software component called the communications manager which emulates multiple virtual communication ports, each virtual port associated with the physical port and a logical modem. Each logical modem implements some unique functionality. In one embodiment, three logical modems are used, one supporting data information, one supporting voice information, and one supporting video information. Existing modem drivers recognize the logical modems as three separate modems upon which connections can be established for different types of information. Coordination of the logical modems enables the simultaneous communication of voice/data/video through the physical port in any combination. As a result, most of the functionality of simultaneous voice/data/video modems is achieved in software, with full compatibility with existing modem drivers. The cost and complexity of the physical modem attached to the physical port is greatly simplified, because most of the complex data-processing functionality formerly implemented in hardware or firmware within the physical modem is now implemented in software by the logical modems executing within the computer system.

Figure 1:
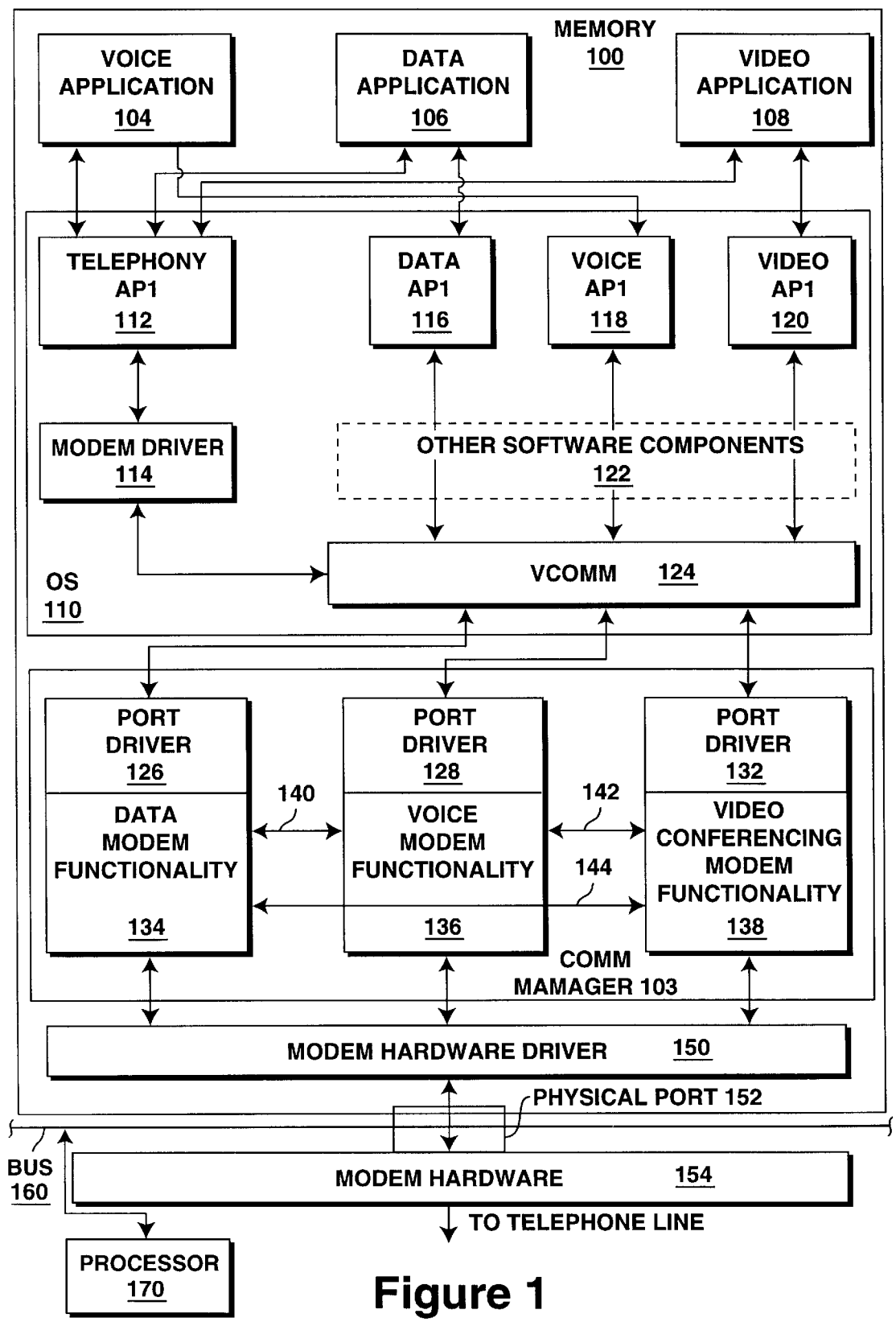
FIG. 1 is a block diagram of one embodiment of a computer system comprising a physical port connected to a physical modem, and a memory including multiple virtual ports and multiple logical modems which interface the virtual ports to the physical port.

FIG. 1 shows a computer system comprising a physical port connected to a physical modem, and a memory including multiple virtual ports and multiple logical modems which interface the virtual ports to the physical port. In FIG. 1, much of the complicated data processing functionality formerly implemented within the modem hardware 154 is now implemented on the processor 170 of the computer using the logical modems 134, 136, 138.

A memory 100 stores various software for use in the computer system, including voice, data, and video applications 104, 106, 108, an operating system 110, and other low-level software components. The memory 100 represents one or more mechanisms for storing instructions and data. For example, the memory 100 may include machine-readable mediums such as read only memory (ROM), random access memory (RAM), magnetic disk storage mediums, optical storage mediums, flash memory devices, and/or other machine-readable mediums. The memory 100 is coupled to a processor 170 by way of a bus 160. The bus 160 represents one or more busses (e.g., PC, ISA, X-Bus, EISA, VESA, optical coupling, etc.) and bridges (also termed as bus controllers). The processor 170 represents a central processing unit of any type of architecture, such as CISC, RISC, VLIW, or a hybrid architecture. In addition, the processor 170 could be implemented on one or more chips. Using the bus 160, the processor 170 accesses the various elements stored in the memory 100.

Modem hardware 154 (the physical modem) is coupled to the processor 170 and the memory 100 by way of the bus 160.

The operating system 110 is used to control the basic functions of the computer system and to provide an interface between programs and the computer hardware. The memory 100 further comprises a virtual modem manager software component 130, the function of which is explained below, and a modem hardware driver 150 which directly interfaces other software components in the system to the modem hardware 154 by way of the physical port 152.

The operating system (OS) 110 is comprised of various software components, including components that implement application programming interfaces (APIs). These API components include a telephony API component 112, a data API component 116, a voice API component 118, and a video API component 120. The telephony API component 112 provides an interface for making and controlling telephone connections. The data API component 116, the voice API component 118, and the video API component 120 provide interfaces for respectively communicating data, voice, and video information from applications to lower software levels in the computer system. Details concerning the use and function of these API components are well known in the art, and are therefor omitted here.

The operating system 110 also includes a modem driver 114 and a virtual port driver manager 124 (VCOMM). The modem driver 114 typically implements vendor-specific modem commands, such as the Hayes™ AT command set for making and controlling telephone connections. The virtual port driver manager 124 is an OS component for managing communication ports. In addition to the above-listed components, the operating system 110 may include other software components not shown and not necessary for an understanding of the invention. For example, other software components 122 may provide an interface between the various APIs 116, 118, 120 and VCOMM 124.

The virtual modem manager 130 is comprised of several components, each implementing a virtual communication port and a logical modem. One component of the virtual modem manager 130 is comprised of a port driver 126 implementing a first virtual communication port, and a logical modem 134 implementing data modem functionality in software. Another component within the virtual modem manager 130 is comprised of a port driver 128 implementing a second virtual port and a logical modem 136 implementing voice modem functionality in software. Still another software component within the virtual modem manager 130 is comprised of a third port driver 132 implementing a third virtual port, and a logical modem 138 implementing video conferencing functionality in software.

Communication is accomplished as follows. The various software applications 104, 106, and 108 establish a telephone connection using the telephony API 112, which in turn interfaces with the modem driver 114 to send vendor-specific commands to VCOMM 124. VCOMM 124 ensures that the commands are routed to the appropriate virtual port associated with the modem for which the commands are intended. For example, when the modem driver 114 establishes a voice connection on behalf of the voice application 104, VCOMM routes the commands to the port driver 128 associated with the logical voice modem 136. If the modem driver 114 is then called upon to establish a data connection on behalf of the data application 104, VCOMM would route the commands to the port driver 128 associated with the logical data modem 134. Because connections for different kinds of information are established using different virtual ports, the modem driver 114 does not find a resource conflict even though the same physical port 152 is used for both connections. This eliminates one of the major impediments to the rapid consumer adoption of simultaneous voice/data modems, namely, the incompatibility with existing modem drivers.

The software interfaces between the applications 104, 106, 108 and the telephony API 112 are well known and will not be repeated here. Likewise, the modem driver 114 communicates with VCOMM 124 by way of a software interface, the details of which are well known, and VCOMM 124 communicates with the port drivers 126, 128, and 132 by way of a well-known software interface.

To communicate information over the connection, the various applications 104, 106, 108 communicate with the various components which implement APIs 112, 116, 118, and 120. These APIs 112, 116, and 118 communicate the information to VCOMM 124, which routes it to the appropriate port driver. Once the information reaches the logical modems 134, 136, and 138, it is communicated to the modem hardware driver 150. The modem hardware driver 150 communicates the information to the modem hardware 154 by way of the physical communication port 152.

The logical data modem 134 communicates with logical voice modem 136 by way of a software interface 140. This interface 140 is used to coordinate the voice and data logical modems 136, 134 to enable simultaneous voice and data communication by way of the single physical port 152. The interface 140 comprises messages, parameters, and data structures which are exchanged among the components to coordinate their behavior. In the example above, the voice application 104 communicates voice information to the logical voice modem 136, and the data application 106 communicates data information to the logical data modem 134. The interface 140 is used to enable one or both of the logical modems to multiplex the voice and data information so that it may be simultaneously communicated to the modem hardware 154 by way of the single physical port 152. The cooperation of the logical modems 134, 136 involves an exchange of information. The logical voice modem 136 may communicate voice information to the logical data modem 134 for multiplexing by the logical data modem 134. Or, the logical data modem 134 may communicate data information to the logical voice modem 136 for multiplexing by the logical voice modem 134. In both cases, both logical modems may also exchange control and synchronization information to enable the multiplexing of the voice and data information. The control and synchronization information necessary for multiplexing voice and data information, for example using the DSVD standard, is well known in the art.

The logical data modem 134 also communicates with the logical video modem 138 by way of a software interface 144. This interface 144 is used to coordinate the video and data logical modems 136, 134 to enable simultaneous video and data communication by way of the single physical port 152. The interface 144 comprises messages, parameters, and data structures which are exchanged among the components to coordinate their behavior. The video application 108 can communicate video information to the logical video modem 138, and the data application 106 can simultaneously communicate data information to the logical data modem 134. The interface 144 is used to enable one or both of the logical modems to multiplex the video and data information so that it may be simultaneously communicated to the modem hardware 154 by way of the single physical port 152. The logical data modem 134 may communicate voice information to the logical video modem 138 for multiplexing by the logical video modem 138. Or, the logical video modem 138 may communicate video information to the logical data modem 134 for multiplexing by the logical data modem 134. In both cases, both logical modems may also exchange control and synchronization information to enable the multiplexing of the data and video information. The control and synchronization information necessary for multiplexing data and video information, for example using the ITU H.324 standard, is well known in the art.

The logical voice modem 136 communicates with the logical video modem 138 by way of a software interface 142. The interface 142 is used to enable one or both of the logical modems to multiplex the video and voice information so that it may be simultaneously communicated to the modem hardware 154 by way of the single physical port 152. The interface 146 comprises messages, parameters, and data structures which are exchanged among the components to coordinate their behavior. When voice, data, and video are all communicated simultaneously, all three interfaces 140, 142, 144 can be used to enable one or more of the logical modems to multiplex the video and data and voice information so that it may be simultaneously communicated to the modem hardware 154 by way of the single physical port 152. The logical voice modem 136 may communicate voice information to the logical video modem 138 for multiplexing by the logical video modem 138. Or, the logical video modem 138 may communicate video information to the logical voice modem 136 for multiplexing by the logical voice modem 136. In both cases, both logical modems may also exchange control and synchronization information to enable the multiplexing of the voice and video information. The control and synchronization information necessary for multiplexing voice and video information, for example using the ITU H.324 standard, is well known in the art.

As FIG. 1 makes evident, many of the functions which were formally performed by the modem hardware are now performed by the communication manager components. Each communication manager component implements a virtual port and a logical modem which performs functions such as packaging data into and out of frames, compression, and communications protocols for a particular type of information (data, voice, or video). The modem hardware 154 is made simpler and cheaper, because the communication manager components executing on the computer processor 170 perform many complex functions in software which were formerly performed by the modem hardware 154.

As an example of the usefulness of the present invention, consider a networked computer game. To play a networked computer game, a voice connection is first made between the players of the game. A software voice application is typically used to make the voice connection, such as the Microsoft Phone™ application. The game application is then launched, and a second connection is made for transferring the game data. The voice information from the players and data information from the game are multiplexed by one or both of the logical voice modem 136 and logical data modem 134 executing on the computer processor 170, and then communicated to the physical port 152 and over the bus 160 to the modem hardware 154. The modem hardware 154 communicates the voice and data over the phone line. The invention simplifies the modem hardware 154 by reducing the complexity of the circuitry required for processing voice, data, and video information. This processing is now performed in software executing on the computer processor 170.

Other embodiments are possible without departing from the scope of the invention. For example, the virtual modem manager 130 need not be a single component with three internal components. Instead, the internal components may be fully autonomous software objects which are not part of any container object. In yet another embodiment, the physical port 152 may represent a collection of multiple related physical ports for communicating with the modem hardware 154 (as opposed to literally comprising a single port). Also, the voice, data, and video applications 104, 106, and 108 may be combined into a single video conferencing application which handles all three data types.

Figure 2:
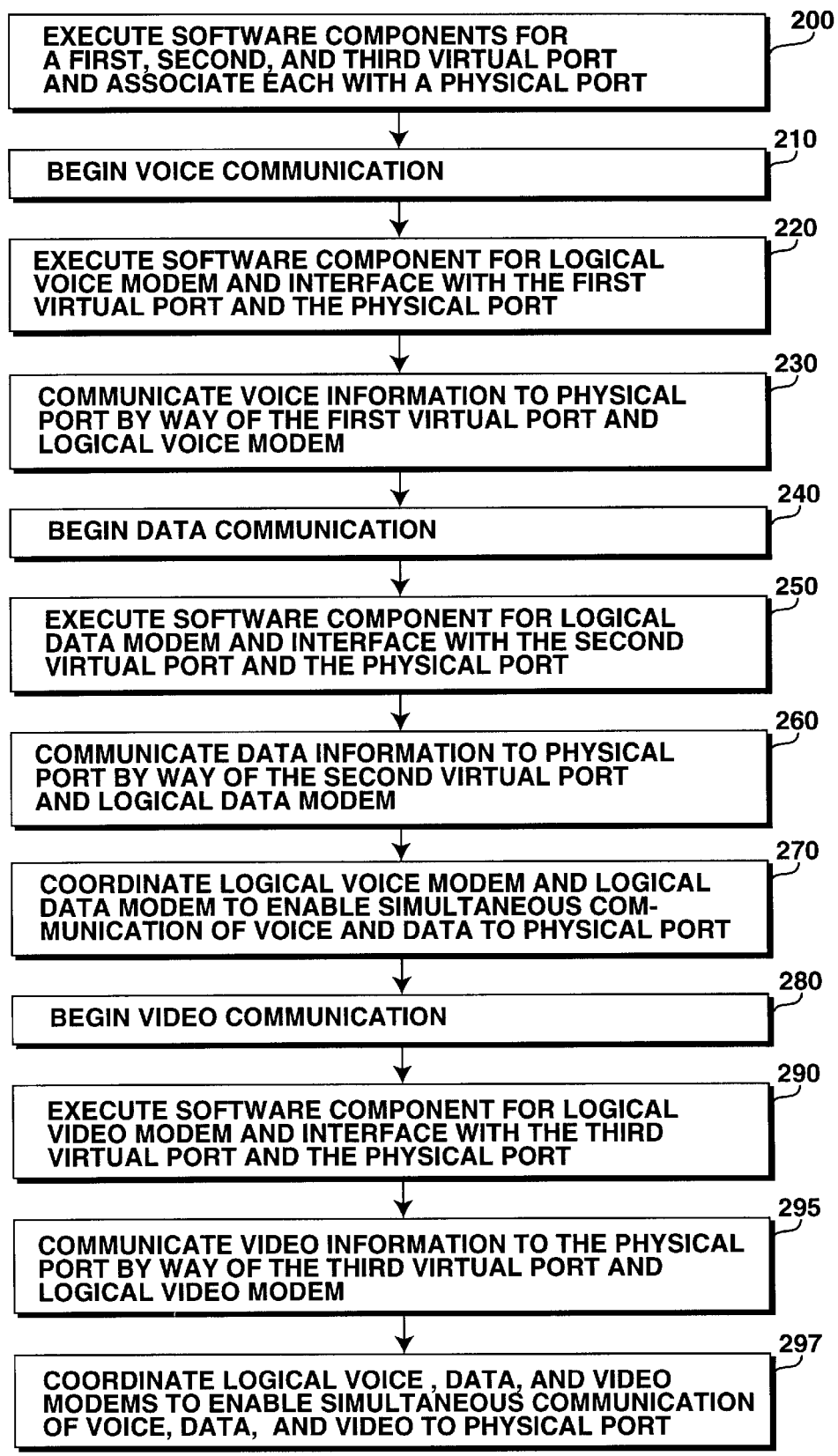
FIG. 2 illustrates a method for enabling simultaneous voice, data, and video communication in a computer system in a manner compatible with existing modem drivers.

FIG. 2 illustrates a method for enabling simultaneous voice, data, and video communication in a computer system in a manner compatible with existing modem drivers. Software components for a first, second, and third virtual port are executed at step 200, and each is associated with the physical port.

After creating the virtual ports, the next step is to begin voice communication 210. The software for the logical voice modem is then executed at step 220, and acts as an interface between the first virtual port and the physical port. The voice information is communicated to the physical port by way of the first virtual port and logical voice modem at step 230. After commencing communication of the voice information to the first virtual port, the next step is to begin data communication at step 240. The software component which implements the logical data modem is executed at step 250 and becomes an interface between the second virtual port and the physical port. Data information is then communicated to the physical port by way of the second virtual port and the logical voice modem at step 260. After communicating the data information to the second virtual port, the next step is to coordinate the logical voice modem and the logical data modem to enable simultaneous communication of voice and data information to the physical port. The coordination may take any form well known in the art, including coordination in accordance with the ITU V.70 DSVD standard.

Video communication is commenced at step 280. The software component which implements the logical video conferencing modem is executed at step 290 and used to interface the third virtual port to the physical port. After executing the software component to create the logical video modem, the next step is to communication video information to the physical port by way of the third virtual port and the logical video modem at step 295. Finally, the logical voice, data, and video modems are coordinated at step 297 to enable simultaneous voice, data, and video communication to the physical port. The coordination may take any form well known in the art, including coordination in accordance with the ITU H.324 teleconferencing standard.

Other embodiments are possible without departing from the scope of the invention. For example, the software components to implement the various logical modems may be executed before voice, data, or video communication is commenced. This embodiment has the disadvantage that one or more logical modems may be present in memory even though they are not required for the particular types of data which are communicated. For example, if only video and voice data are communicated, it is inefficient to execute the code to implement the data modem, since this logical modem is not used. Of course, although the voice communication is illustrated as occurring first at step 210, any of the voice, data, or video communications could be established in any order.

Figure 3:
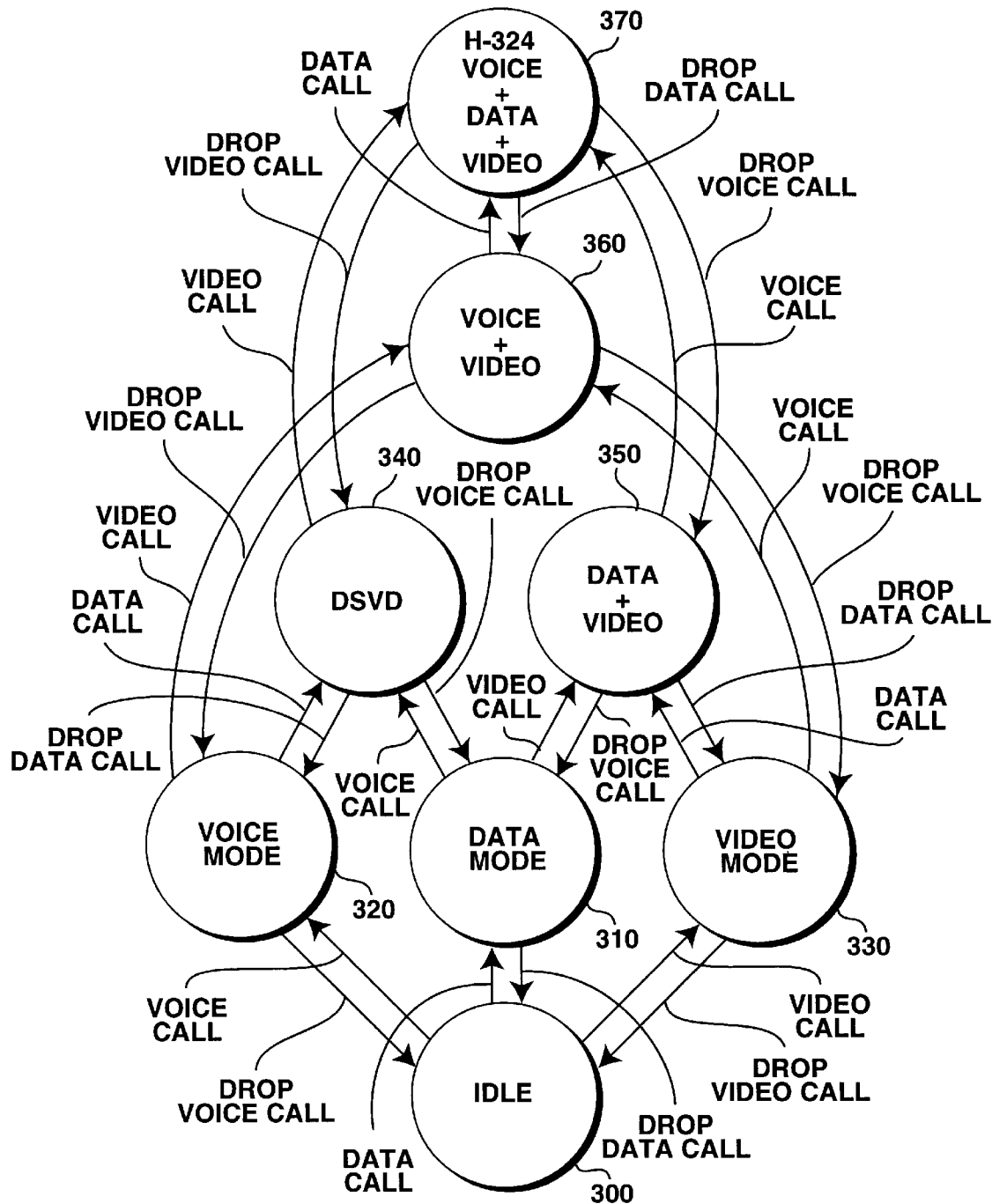
FIG. 3 illustrates states in which the communication manager may operate.

FIG. 3 illustrates the states in which the communication manager may operate. At state IDLE 300, the communication manager is inactive and no information is communicated through the physical port. If a voice call is established, the state of the communication manager transitions to VOICE MODE 320. If however a video call is established during the IDLE state 300, the state of the communication manager transitions to VIDEO MODE 330. The initiation of a data call during the IDLE state 300 causes the state of the communication manager to transition to the DATA MODE state 310.

At state VOICE MODE 320, the logical voice modem component of the communication manager is active, and voice information is communicated to the physical port. If a data call is established during VOICE MODE 320, the state of the communication manager transitions to the DSVD state 340 (simultaneous voice and data communication). The initiation of a video call while in VOICE MODE 320 causes the state of the communication manager to transition to the VOICE+VIDEO state 360. If the voice call is dropped during the VOICE MODE state 320, the state of the communication manager transitions back to the IDLE state 300.

At state VIDEO MODE 330, the logical video modem component of the communication manager is active, and video information is communicated to the physical port. If a data call is established the state of the communication manager transitions to the DATA+VIDEO state 350. Initiation of a data call while in the VIDEO MODE state 330 causes the state of the communication manager to transition to the DATA+VIDEO state 350. If the video call is dropped while in the VIDEO MODE state 330, the state of the communication manager transitions back to the IDLE state 300.

At state DATA MODE 310, the logical data modem component of the communication manager is active, and data information is communicated to the physical port. If a voice call is established while in DATA MODE 310, the state of the communication manager transitions to the DSVD state 340. Initiating a video call while in the DATA MODE state 310 causes the state of the communication manager to transition to the DATA+VIDEO state 350. If the data call is dropped while in the DATA MODE state 310, the state of the communication manager transitions back to the IDLE state 300.

At state DSVD 340, the logical voice modem and the logical data modem cooperate within the communication manager to communication simultaneous voice and data information to the physical port. The cooperation may take any form well known in the art, including cooperation in accordance with the ITU V.70 DSVD standard. If a video call is established while in the DSVD state, the state of the communication manager transitions to the VOICE+DATA+VIDEO state 370. If the data call is dropped while in the DSVD state 340, the state of the communication manager transitions back to the VOICE MODE state 320. If the voice call is dropped while in the DSVD state, the state of the communication manager transitions back to the DATA MODE state 310.

At state DATA+VIDEO 350, the logical data modem and the logical video modem components of the communication manager cooperate to communicate simultaneous data and video information to the physical port. The cooperation may take any form well known in the art, including cooperation in accordance with the ITU H.324 teleconferencing standard. If a voice call is established while in the DATA+VIDEO state 350, the state of the communication manager transitions to the VOICE+DATA+VIDEO state 370. If the video call is dropped while in the DATA+VIDEO state, the state of the communication manager transitions back to the DATA MODE state 310. If the data call is dropped while in the DATA+VIDEO state, the state of the communication manager transitions back to the VIDEO MODE state 330.

At state VOICE+VIDEO, the logical voice modem and the logical video modem cooperate within the communication manager to communicate voice and video information simultaneously to the physical port. The cooperation may take any form well known in the art, including cooperation in accordance with the ITU H.324 teleconferencing standard. If a data call is established while in the VOICE+VIDEO state, the state of the communication manager transitions to the VOICE+DATA+VIDEO state 370. If the video call is dropped while in the VOICE+VIDEO state, the state of the communication manager transitions back to the VOICE MODE state 320. If the voice call is dropped while in the VOICE+VIDEO state, the state of the communication manager transitions back to the VIDEO MODE state 330.

At state VOICE+DATA+VIDEO, the logical voice, data, and video modem components of the communication manager cooperate to enable simultaneous voice, data, and video communication to the physical port (a video conference). The cooperation may take any form well known in the art, including cooperation in accordance with the ITU H.324 teleconferencing standard. If the video call is dropped, the state of the communication manager transitions to the DSVD state 340. If the data call is dropped, the state of the communication manager transitions back to the VOICE+VIDEO state 360. If the voice call is dropped, the state of the communication manager transitions back to the DATA+VIDEO state 350.

In summary, the invention improves improvements over traditional simultaneous voice/data (and voice/data/video) modems by 1) eliminating much of the hardware complexity required to enable simultaneous voice/data/video within the modem hardware and implementing it in software within the computer system, and 2) providing compatibility with existing modem drivers which often do not recognize the capabilities of modems with simultaneous capabilities. The costs of the modem hardware are reduced because much of the expensive, complicated functionality associated with communicating voice, data, and video is implemented in software within the computer system instead of using special circuits inside the modem hardware.

Although this invention has been shown in relation to a particular embodiment, it should not be considered so limited. Rather, the invention is limited only by the scope of the appended claims.

What is claimed is:

1. In a computer system comprising a processor and an operating system, a modem comprising:
   a physical communication port to couple the computer system to a phone line;
   a memory coupled to the processor, the memory comprising
   a first software component to be executed by the processor, and dedicated to providing data inputs to the physical communication port;
   a second software component to be executed by the processor, and dedicated to providing voice inputs to the physical communication port; and
   the first and second software components being different software components, and the two software components cooperating with each other to enable simultaneous voice and data communication through the physical communication port.

2. The modem of claim 1, the memory further comprising:
   the first software component when executed by the processor causing the physical communication port to appear to the operating system as a first logical port connected to a first logical modem dedicated to data communication;
   the second software component when executed by the processor causing the physical communication port to appear to the operating system as a second logical port connected to a second logical modem dedicated to voice communication; and
   a first communication interface between the first and second software components to facilitate coordination between the first and second software components to effectuate simultaneous voice and data communication through the physical communication port.

3. The modem of claim 2, the memory further comprising:
   a third software component to be executed by the processor, and to cause the physical communication port to appear to the operating system as a third logical port connected to a third logical modem dedicated to video communication, the first, second and third software components being different software components.

4. The modem of claim 3, the memory further comprising:
   a second communication interface between the first and third software components to facilitate cooperation between the first and third software components to effectuate simultaneous data and video communication through the physical communication port, the first and second communication interfaces being different communication interfaces; and
   a third communication interface between the second and third software components to facilitate cooperation between the second and third software components to effectuate simultaneous voice and video communication through the physical communication port, the first, second and third communication interfaces being different communication interfaces;
   the first, second, and third communication interfaces further facilitating cooperation among the three software components to effectuate simultaneous voice and data and video communication through the physical communication port.

5. In a computer system comprising a processing means and an operating system, a modem comprising:
   means for coupling the computer system to a phone line;
   memory means coupled to the processing means, the memory means comprising
   a first software means to be executed by the processing means, and dedicated to providing data inputs to the physical communication port;
   a second software means to be executed by the processing means, and dedicated to providing voice inputs to the physical communication port; and
   the first and second software means being different software means, and cooperating with each other to enable simultaneous voice and data communication through the physical communication port.

6. The modem of claim 5, the memory means further comprising:
   the first software means to be executed by the processing means to cause the coupling means to appear to the operating system as a first communication means dedicated to data communication;
   the second software means executed by the processing means to cause the coupling means to appear to the operating system as a second communication means dedicated to voice communication; and
   first interface means between the first and second software means to facilitate cooperation between the first and second software means to effectuate simultaneous voice and data communication through the coupling means.

7. The modem of claim 6, the memory means further comprising:
   third software means to be executed by the processing means to cause the coupling means to appear to the operating system as a fourth communication means dedicated to video communication, the first, second and third software means being different software means.

8. The modem of claim 7, the memory means further comprising:

second interface means between the first and third software means to facilitate cooperation between the first and third software means to effectuate simultaneous data and video communication through the coupling means, the first and second interface means being different interface means; and sixth communication means between the second and third software means to facilitate cooperation between the second and third software means to effectuate simultaneous voice and video communication through the coupling means, the first, second and third interface means being different interface means;

the first, second and third interface means further facilitating cooperation between the first, second and third software means to effectuate simultaneous voice and data and video communication through the coupling means.

9. A computer system comprising:

a bus;

a processor;

a modem, the modem comprising:

a physical communication port to couple the computer system to a phone line;

a memory coupled to the processor, the memory comprising a first software component to be executed by the processor, and dedicated to data inputs to the physical communication port;

a second software component to be executed by the processor, dedicated to voice inputs to the physical communication port; and the first and second software components being different software components, and cooperating to enable simultaneous voice and data communication through the physical communication port.

10. The computer system of claim 9, the memory further comprising:

the first software component when executed by the processor causing the physical communication port to appear to the operating system as a first logical port connected to a first logical modem dedicated to data communication;

the second software component when executed by the processor causing the physical communication port to appear to the operating system as a second logical port connected to a second logical modem dedicated to voice communication; and a first communication interface between the first and second software components to facilitate cooperation between the first and second software components to effectuate simultaneous voice and data communication through the physical communication port.

11. The computer system of claim 10, the memory further comprising:

a third software component to be executed by the processor to cause the physical communication port to appear to the operating system as a third logical port connected to a third logical modem dedicated to video communication, the first, second and third software components being different software components.

12. The computer system of claim 11, the memory further comprising:

a second communication interface between the first and third software components to facilitate cooperation between the first and third software components to effectuate simultaneous data and video communication through the physical communication port, the first and second communication interface being different communication interfaces; and a third communication interface between the second and third software components to facilitate cooperation between the second third software components to effectuate simultaneous voice and video communication through the physical communication port, the first, second and third communication interfaces being different communication interfaces;

the first, second, and third communication interfaces further facilitating cooperation among the first, second and third software components to effectuate simultaneous voice and data and video communication through the physical communication port.

13. In a computer system comprising a processor, a method of facilitating simultaneous voice and data communication through a physical port, the method comprising the steps of:

creating a first virtual port and a second virtual port, the first virtual port and the second virtual port being different virtual ports and each associated with the physical port;

interfacing a first software component between the first virtual port and the physical port, the first software component when executed by the processor implementing a logical voice modem dedicated to providing voice inputs to the physical port;

interfacing a second software component between the second virtual port and the physical port, the first and second software components being different software components, and when executed by the processor, the second software component implementing a logical data modem dedicated to providing data inputs to the physical port;

communicating voice information to the first virtual port, the first virtual port communicating the voice information to the logical voice modem;

communicating data information to the second virtual port, the second virtual port communicating the data information to the logical data modem; and coordinating the logical voice modem and the logical data modem to effectuate simultaneous communication of the voice information and the data information to the physical port.

14. The method of claim 13 further comprising the steps of:

creating a third virtual port, the first, second and third virtual ports being different virtual ports, and associating the third virtual port with the physical port;

interfacing a third software component between the third virtual port and the physical port, the first, second and third software components being different software components, and when executed by the processor the third software component implementing a logical video modem dedicated to providing video communication to the physical port;

communicating video information to the third virtual port, the third virtual port communicating the video information to the logical video modem; and coordinating the logical voice modem and the logical data modem and the logical video modem to effectuate simultaneous communication of the voice information and the data information and the video information to the physical port.

* * * * *